United States Patent [19]

Wang

[11] Patent Number: 5,014,947

[45] Date of Patent: May 14, 1991

[54] VISOR MOUNTING APPARATUS FOR RADAR DETECTORS

[76] Inventor: Frank Wang, 46-58 189th St., Flushing, N.Y. 11358

[21] Appl. No.: 541,397

[22] Filed: Jun. 21, 1990

[51] Int. Cl.$^5$ .............................................. A47B 96/06
[52] U.S. Cl. .................................. 248/214; 224/312; 361/417; 439/928
[58] Field of Search .................. 248/214, 206.5, 309.4; 439/928, 929, 534, 527, 59; 361/427, 429, 417, 418, 419, 420, 393; 224/312

[56] References Cited

U.S. PATENT DOCUMENTS

| | | | |
|---|---|---|---|
| 4,241,859 | 12/1980 | Eames | 224/312 |
| 4,326,653 | 4/1982 | Stone | 224/312 |
| 4,391,053 | 7/1983 | Anthony | 224/312 |
| 4,527,285 | 7/1985 | Kekas | 361/429 |
| 4,558,914 | 12/1985 | Prager | 439/928 X |
| 4,648,737 | 3/1987 | Lake | 439/928 X |
| 4,760,497 | 7/1988 | Roston | 361/417 X |
| 4,790,762 | 12/1988 | Harms | 439/59 |
| 4,866,572 | 9/1989 | Blodgett | 361/393 |
| 4,887,753 | 12/1989 | Allen | 224/312 |
| 4,893,263 | 1/1990 | Myers | 439/928 X |

Primary Examiner—J. Franklin Foss
Attorney, Agent, or Firm—Leon Gilden

[57] ABSTRACT

An apparatus including a support plate with a "U" shaped flange formed with serrated confronting teeth for securement to a visor of an automobile. The support plate includes a plurality of spaced, elongate magnetic plates with conductive strip members orthogonally mounted to opposed lateral elongate edges of each of the strips. Aligned between each of the strips is a first and second recess of dissimilar geometric configurations for complementarily receiving a first and second projection mounted to a top surface of a radar detector receivable within each of the respective recesses. A first and second securement plate is magnetically attachable to each of the conductive strip pairs for selective securement of the detector to the conductive strip pairs, and wherein each of the securment plates are in electrical communication with the radar detector, and wherein each of the first and second conductive plates includes an individual electrical wire for providing efficient and immediate electrical communication of the radar detector to the automotive circuitry. A modification of the securement plate includes a "U" shaped recess to receive a "U" shaped magnetic strip therewithin. A modification of the support plate includes a plurality of straps provided with hook and loop fastener attachment portions for securement about an automotive sun visor.

7 Claims, 7 Drawing Sheets

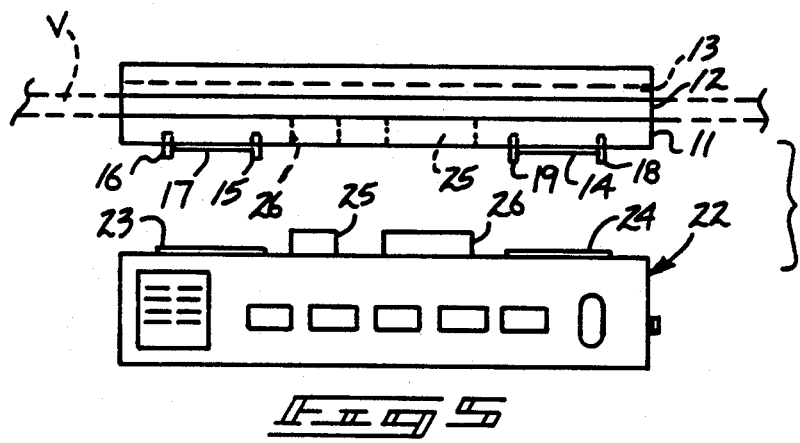
Fig 5
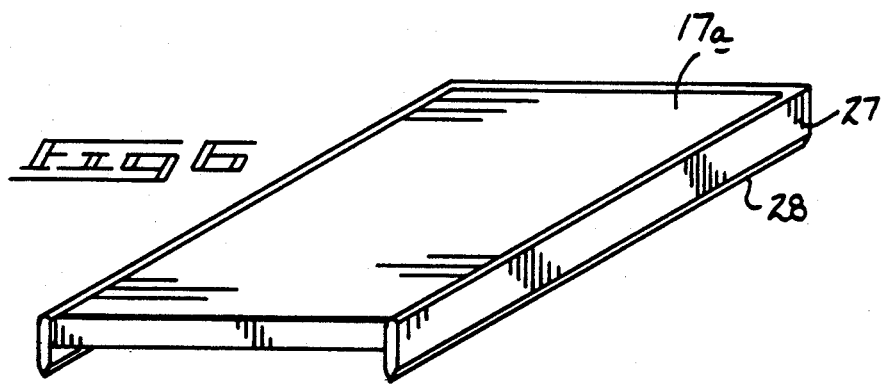
Fig 6
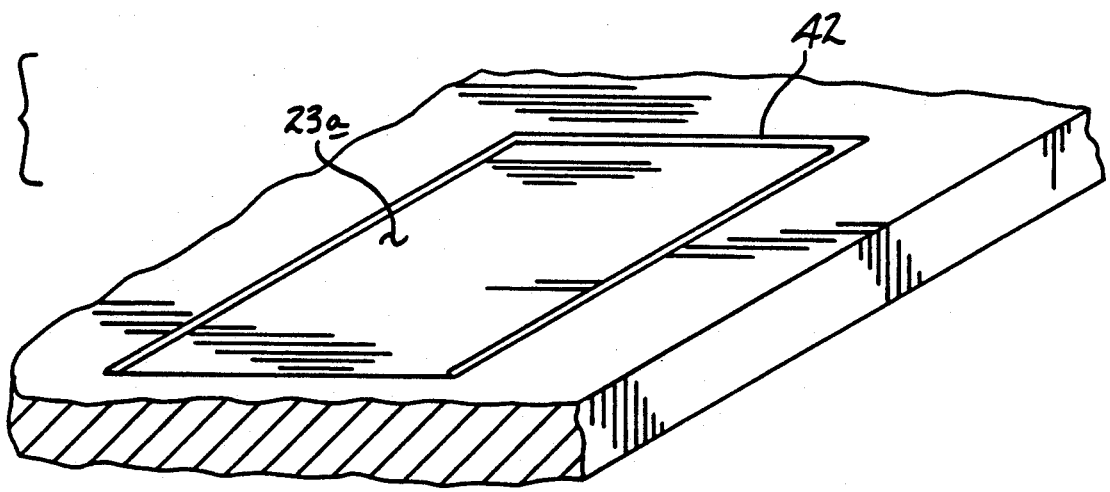

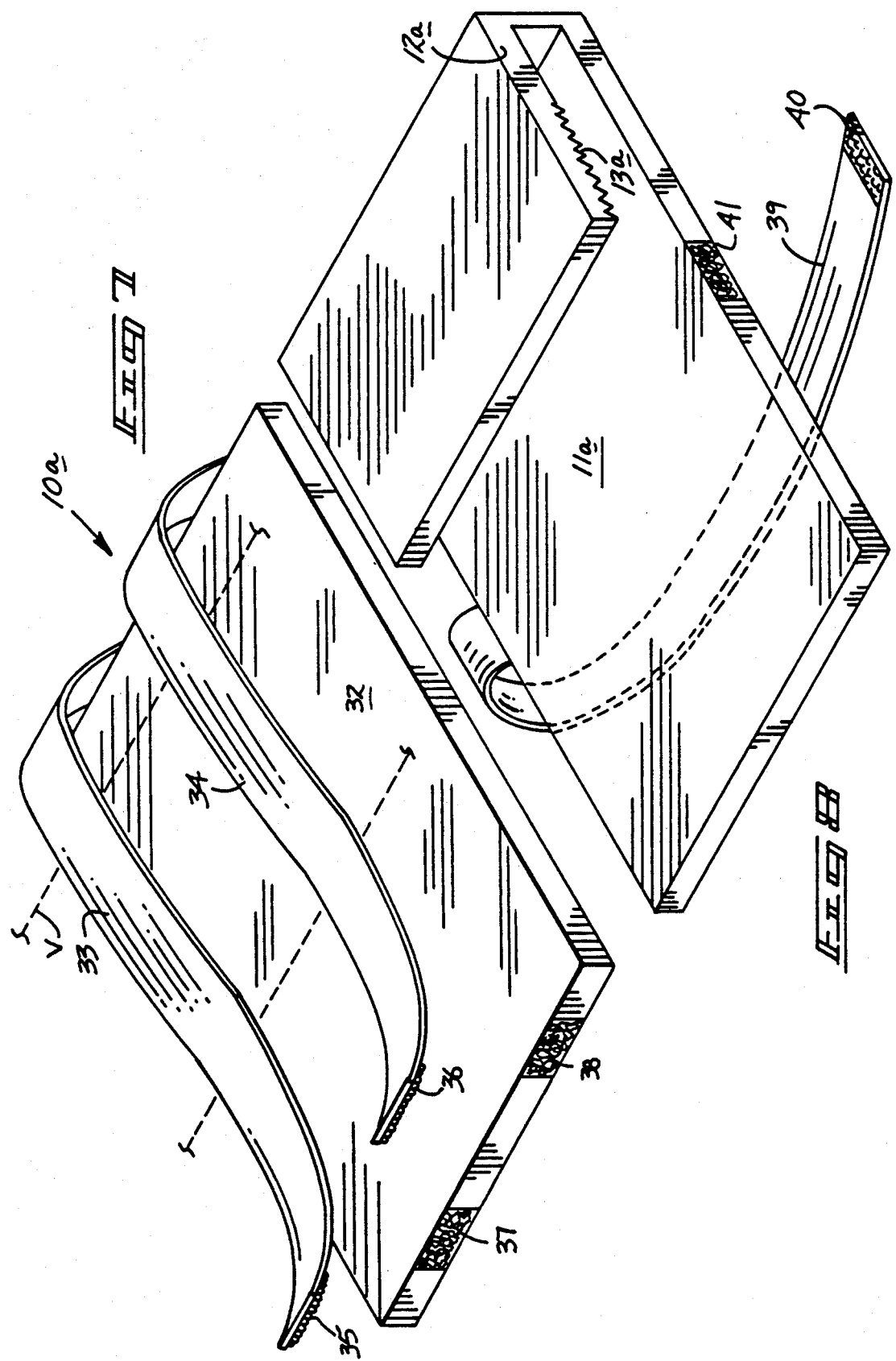

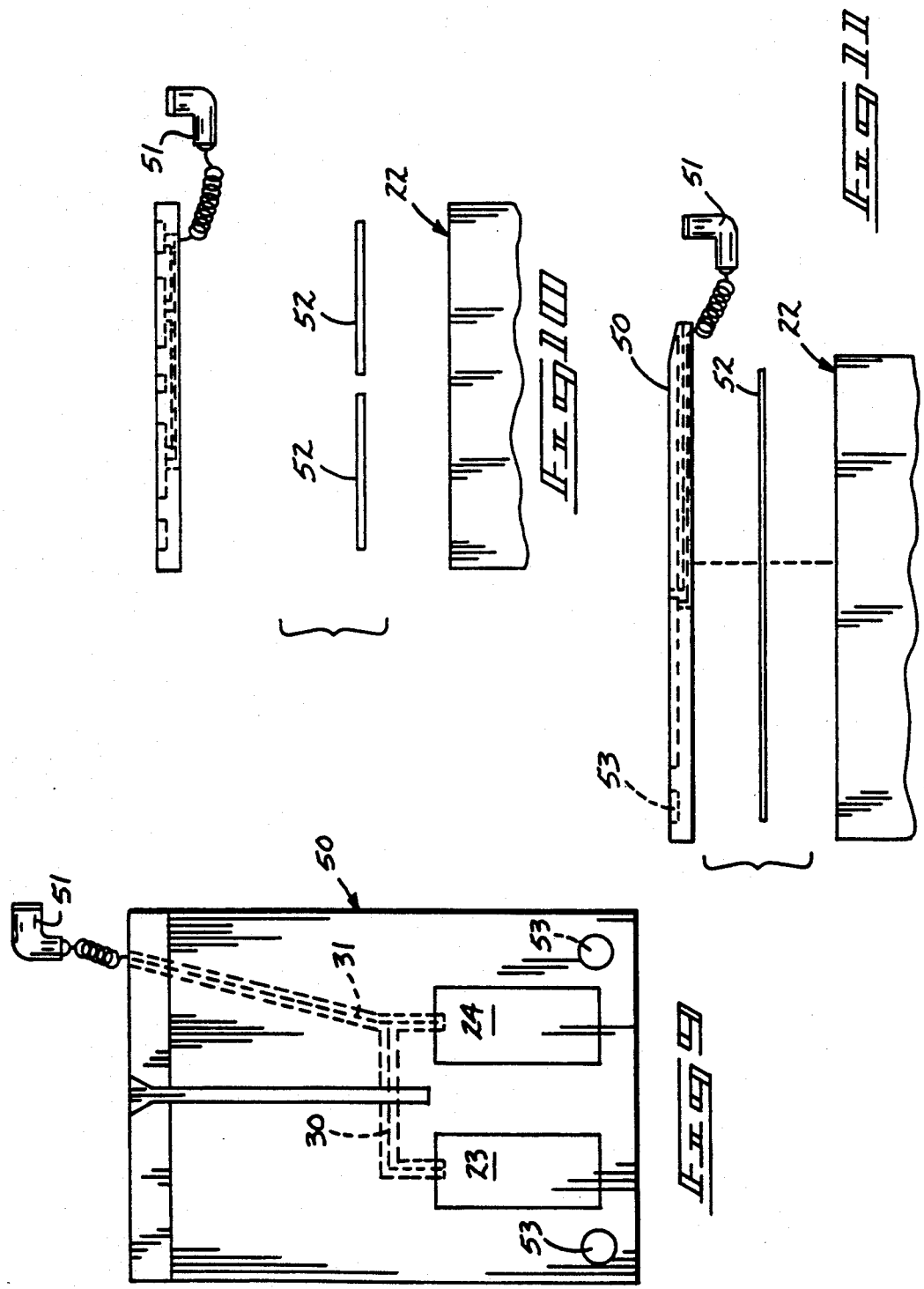

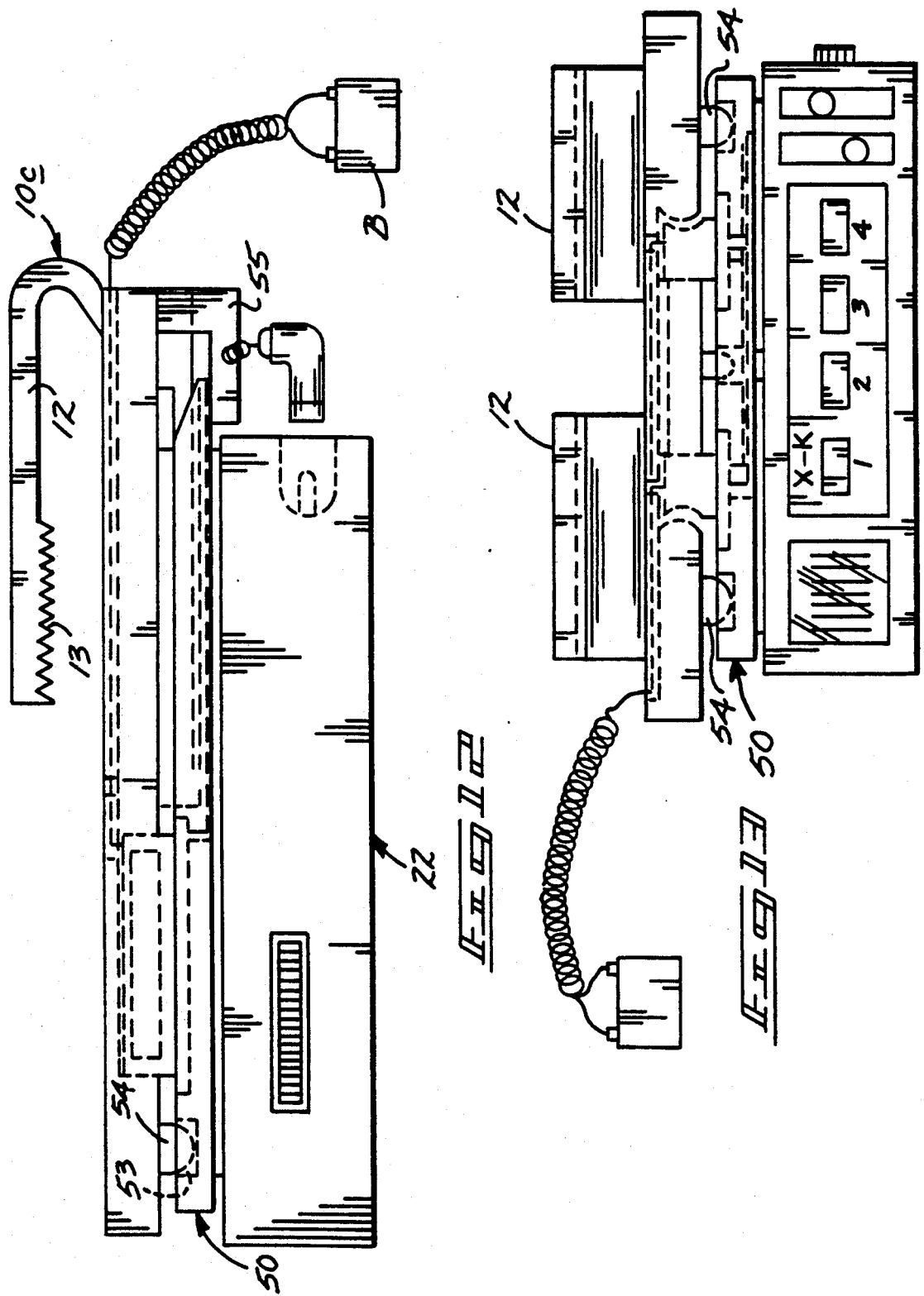

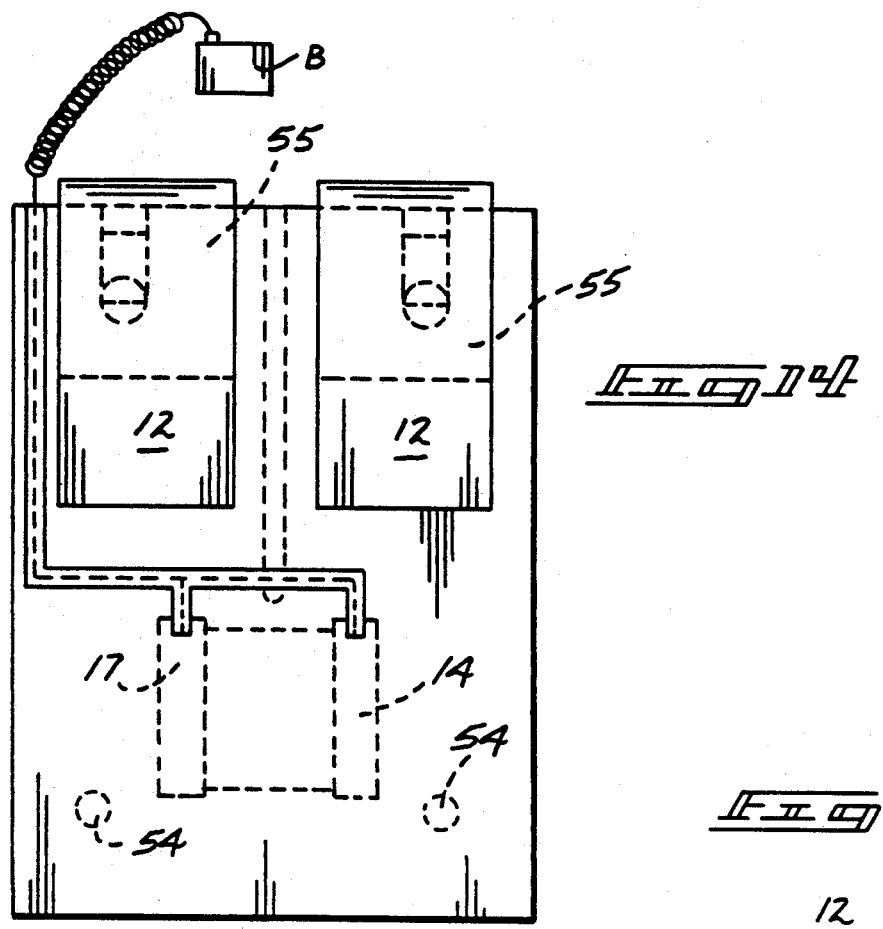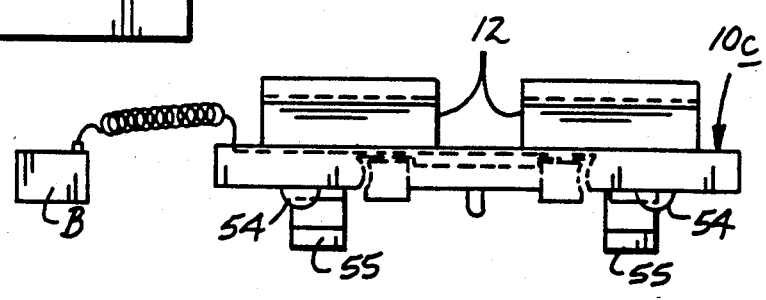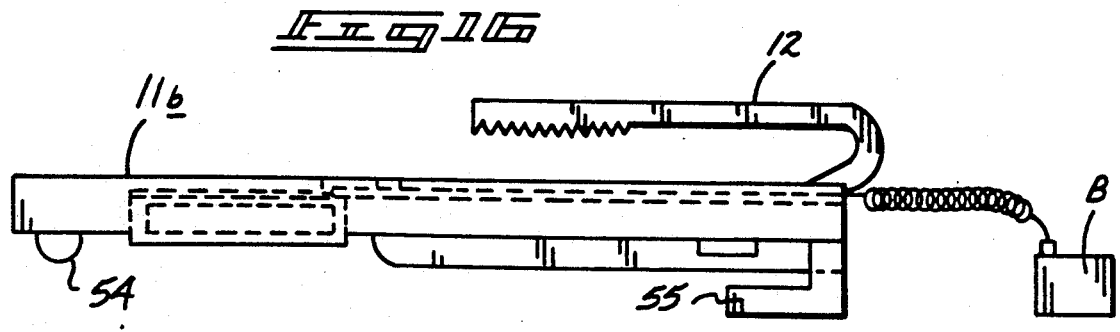

VISOR MOUNTING APPARATUS FOR RADAR DETECTORS

BACKGROUND OF THE INVENTION

1. Field of the Invention

The field of the invention relates to radar detector securement mounts, and more particularly pertains to a new and improved visor mounting apparatus for radar detectors wherein the same may be selectively secured to a visor of an automobile to provide immediate electrical communication with the automotive circuitry.

2. Description of the Prior Art

The selective securement of a radar detector to a visor of an automobile has been addressed by the prior art, wherein the prior art utilizes various securement attachment portions to enable securement of a radar detector unit to an associated visor. There remains a need to provide immediate securement of a radar detector to an associated visor and removal therefrom inasmuch as radar detectors, due to their visibility and high cost, are frequently targets for theft, whereupom their selective removal is desired. Further, several States include laws prohibiting the use of radar detectors and in travel through such States, removal of a radar detector is deemed necessary. Examples of the prior art include U.S. Pat. No. 4,760,797 to Roston setting forth a mounting bracket for a radar detector with a securement member including electrical communication therewith secured to a windshield of an automobile with a "V" shaped bracket provided with a connector securable to the securement member, wherein the "V" shaped bracket is mounted to an associated radar detector.

U.S. Pat. No. 4,648,572 to Sockol sets forth a generally "V" shaped bracket provided with a series of suction cups thereon for securement to an automobile windshield to enable positioning of radar detector onto the bracket.

U.S. Pat. No. 4,635,110 to Weinblatt sets forth an apparatus for displaying a video program to back seat passengers within an automobile providing a generally "U" shaped bracket provided with a padded head portion, with a plurality of panels suspended therefrom by a hinge, with an opening in the rear headrest portion for receiving a TV set therein in cooperation with a VCR. The apparatus of the Weinblatt patent is of interest relative to the use of a unique bracket arrangement for a specialized use.

U.S. Pat. No. 4,419,770 to Yagi, et al., sets forth a wrist mounted receiving unit with various accessory portions thereon including a speaker, AM radio receiver, and clock with associated circuitry to effect operation of the various devices.

U.S. Pat. No. 4,613,989 to Fende, et al., sets forth a device for receiving and alerting an individual to the microwave oscillations of radar units utilized by police and associated bracketry therefore.

As such, it may be appreciated that there is a continuing need for a new and improved visor mounting apparatus for radar detectors wherein the same addresses both the problems of ease of use and effectiveness in construction and this respect, the present invention substantially fulfills this need.

SUMMARY OF THE INVENTION

In view of the foregoing disadvantages inherent in the known types of radar detector bracketry now present in the prior art, the present invention provides a visor mounting apparatus for radar detectors wherein the same enables selective securement and electrical communication with a respective automobile visor and automobile circuitry in use. As such, the general purpose of the present invention, which will be described subsequently in greater detail, is to provide a new and improved visor mounting apparatus for radar detectors which has all the advantages of the prior art detector mounting brackets and none of the disadvantages.

To attain this, the present invention includes a support plate with a "U" shaped flange formed with serrated confronting teeth for securement to a visor of an automobile. The support plate includes a plurality of spaced, elongate magnetic plates with conductive strip members orthogonally mounted to opposed lateral elongate edges of each of the strips. Aligned between each of the strips is a first and second recess of dissimilar geometric configurations for complementarily receiving a first and second projection mounted to a top surface of a radar detector receivable within each of the respective recesses. A first and second securement plate is magnetically attachable to each of the conductive strip pairs for selective securement of the detector to the conductive strip pairs, and wherein each of the securement plates are in electrical communication with the radar detector, and wherein each of the first and second conductive plates includes an individual electrical wire for providing efficient and immediate electrical communication of the radar detector to the automotive circuitry. A modification of the securement plate includes a "U" shaped recess to receive a "U" shaped conductive strip therewith. A modification of the support plate includes a plurality of straps provided with hook and loop fastener attachment portions for securement about an automobile sun visor.

My invention resides not in any one of these features per se, but in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the following abstract is to enable the U.S. Patent and Trademark Office and the public generally, and specifically the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved visor mounting apparatus for radar detectors which has all the advantages of the prior art radar detector mounting apparatus and none of the disadvantages.

It is another object of the present invention to provide a new and improved visor mounting apparatus for radar detectors which may be easily and efficiently manufactured and marketed.

It is a further object of the present invention to provide a new and improved visor mounting apparatus for radar detectors which is of a durable and reliable construction.

An even further object of the present invention is to provide a new and improved visor mounting apparatus for radar detectors which is susceptible of a low cost of manufacture with regard to both materials and labor, and which accordingly is then susceptible of low prices of sale to the consuming public, thereby making such visor mounting apparatus for radar detectors economically available to the buying public.

Still yet another object of the present invention is to provide a new and improved visor mounting apparatus for radar detectors which provides in the apparatuses and methods of the prior art some of the advantages thereof, while simultaneously overcoming some of the disadvantages normally associated therewith.

Still another object of the present invention is to provide a new and improved visor mounting apparatus for radar detectors wherein the same provides bracketry enabling ease of securement to an automobile visor and enabling magnetic securement and electrical communication of the radar detector to the bracketry.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an orthographic frontal view taken in elevation of the instant invention secured to an associated automobile visor.

FIG. 6 is an isometric illustration of a modified securement plate utilized by the instant invention.

FIG. 7 is an isometric illustration of a modified support plate utilized by the instant invention.

FIG. 8 is an isometric illustration of a yet further modified support plate of the instant invention.

FIG. 9 is a top orthographic view of an intermediate plate utilized by the instant invention.

FIG. 10 is an orthographic frontal view, taken in elevation, somewhat exploded, of the intermediate plate for association with a conventional radar detector and the like.

FIG. 11 is a orthographic side view, taken in elevation, of the intermediate plate for association with the radar detector of the instant invention.

FIG. 12 is an orthographic side view, taken in elevation, of the intermediate plate in association with the mounting apparatus of the instant invention.

FIG. 13 is an orthographic frontal view, taken in elevation, of the intermediate plate in association with the mounting apparatus of the instant invention.

FIG. 14 is an orthographic top view of the modified mounting apparatus of the instant invention.

FIG. 15 is an orthographic front view, taken in elevation, of the modified apparatus 10c of the instant invention.

FIG. 16 is an orthographic side view of the modified mounting apparatus 10c of the instant invention.

DESCRIPTION OF THE PREFERRED EMBODIMENT

Figure 1:
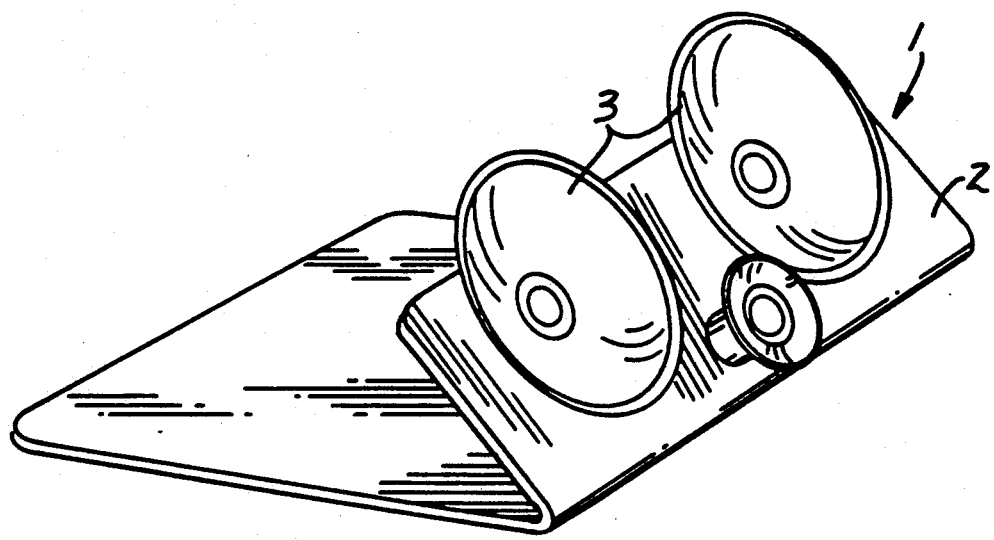
FIG. 1 is an isometric illustration of a prior art radar detector bracket.

With reference now to the drawings, and in particular to FIGS. 1 to 16 thereof, a new and improved visor mounting apparatus for radar detectors embodying the principles and concepts of the present invention and generally designated by the reference numeral 10 will be described.

Figure 2:
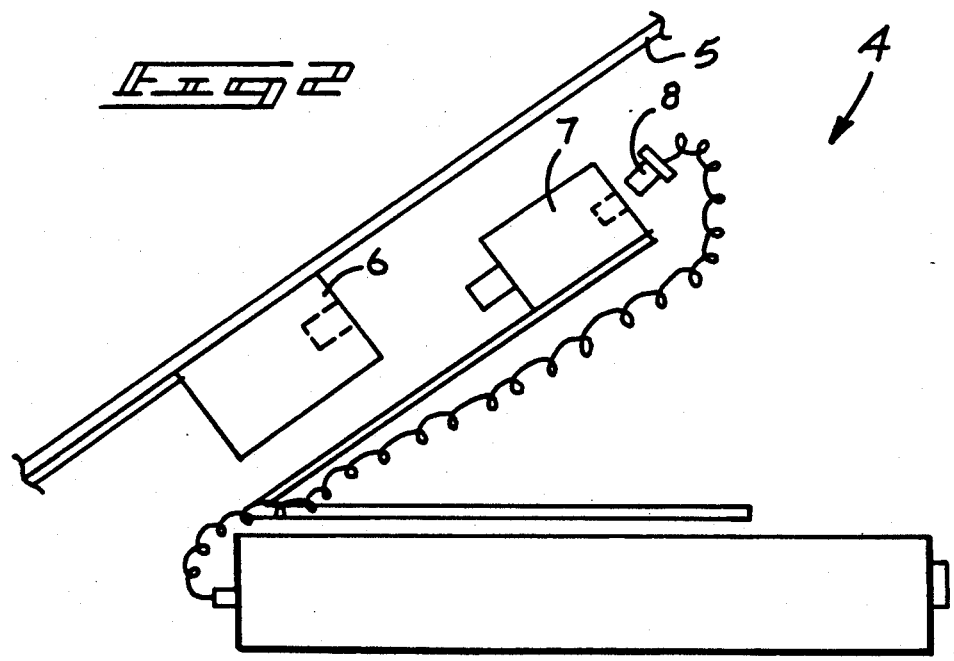
FIG. 2 is an orthographic side view taken in elevation of a further example of a prior art radar detector bracket.
Figure 3:
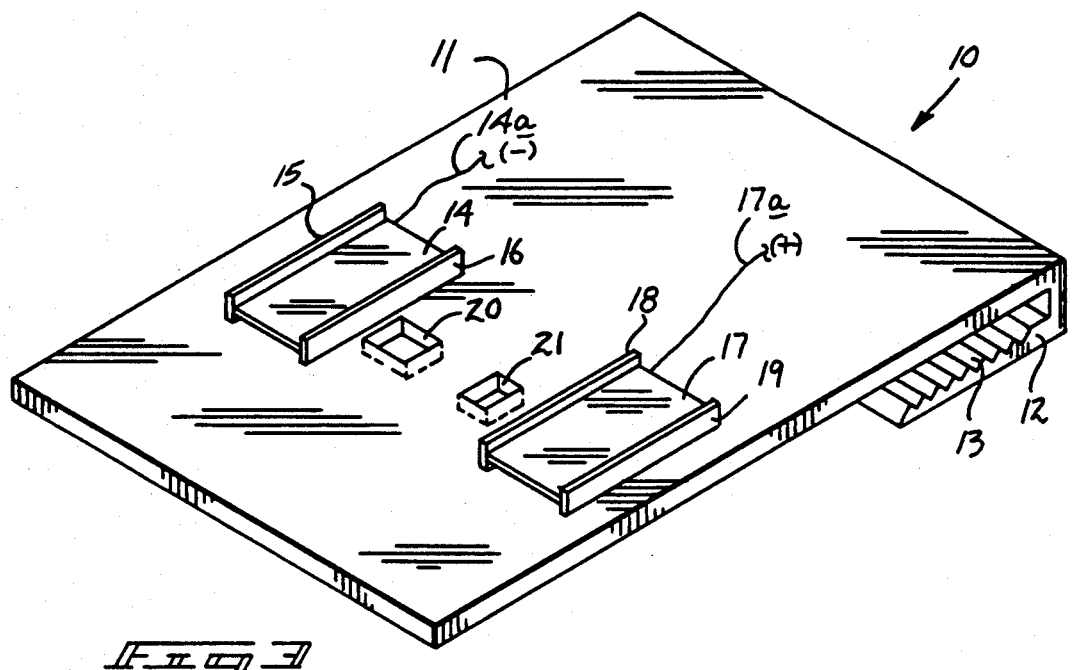
FIG. 3 is an isometric illustration of the radar detector securement bracket of the instant invention.
Figure 4:
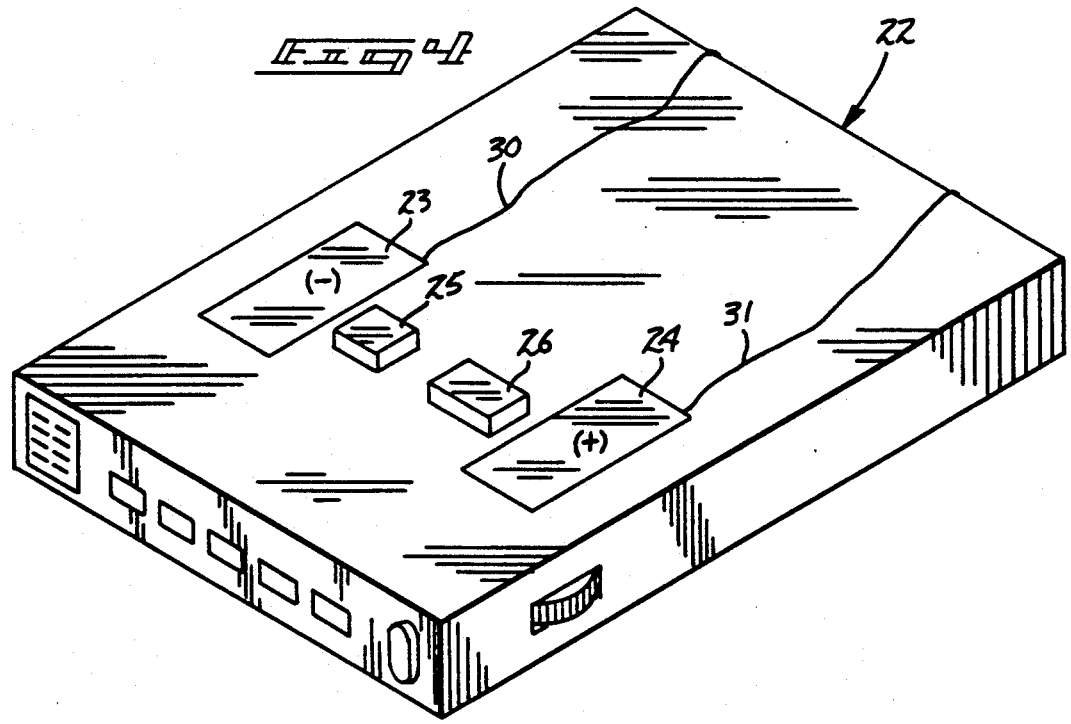
FIG. 4 is an isometric illustration of a conventional radar detector in association with mounting members positioned thereon.

With reference to FIGS. 1 and 2, prior art radar detector mounting bracketry is illustrated, wherein FIG. 1 illustrates a prior art mounting bracket 1 formed of a "V" shaped bracket 2 utilizing a plurality of suction cups 3 for securement of the bracket to an automotive windshield to enable mounting of a radar detector onto a horizontally extending plate of the "V" shaped bracket. FIG. 2 illustrates a radar detector with a "V" shaped plate secured thereto, wherein the "V" shaped plate includes a plug member 7 in electrical communication with a radar detector for reception within a securement member 6 that is secured to a windshield 5 of an automobile. The member 6 is in electrical communication with the associated automotive circuitry to enable ease of securement of the device and in electrical communication with automotive circuitry for operation of the radar detector.

More specifically, the apparatus of the instant invention essentially comprises a planar support plate 11 including a "U" shaped flange 12 parallel to and underlying a bottom surface of the support plate 11, with a serrated horizontal confronting surface 13 confronting the bottom surface of the support plate 11 for receiving a visor therewithin of a conventional automobile.

A first, elongate conductive plate 14 is spaced from and parallel to a second elongate conductor plate 17 mounted to an upper surface of the support plate 11, with a respective first conductive wire 14a and a second conductive wire 17a mounted through respective first and second conductive plates 14 and 17, wherein the conductive wires 14a and 17a are associated with a respective ground and positive connections of the direct current system of the automobile. Fixedly and orthogonally mounted to the elongate lateral sides of the first and second magnetic plates 14 and 17 are respective first and second conductive strips 15 and 16, and a third and fourth conductive strip 18 and 19. The conductive strips 15, 16, 18, and 19 are orthogonally aligned relative to the planar surfaces of the magnetic plates and are aligned parallel relative to one another. The respective pairs of first and second, and third and fourth conductive strips 15, 16, and 18, 19 are spaced apart a predetermined distance. Mounted to an upper surface of a conventional radar detector 22 is a first and second securement plate 23 and 24 aligned parallel to one another and of a width greater than or equal to the spacing of the predetermined distance defined by the pairs of conductive strips 15, 16 and 18, 19, wherein the conductive strips adherably secure the securement plates 23 and 24 to the plate 11, as illustrated in FIG. 5. The securement plates 23 and 24 may be adhesively secured to the upper surface of the radar detector 22 and are of a length equal to or greater than the length of each of the conductive strips 15, 16 and 18, 19 to receive the conductive strips thereon for magnetic securement of the radar detector 22 to the support plate 11. The support plate 11, as illustrated in FIG. 5, receives the automotive visor "V" between the flange 12 and the bottom surface of the support plate 11. Further, aligned with and formed between the first and second conductive plates 14 and 17 are a respective first and second recess 20 and 21. The first recess 20 is of a geometric configuration dissimilar to that of the second recess 21 to enable reception of a respective first and second projection 25 and 26 that are mounted between the first and second securement plates 23 and 24 to ensure that the polarity of the securement plates 23 and 24 are aligned with appropriate polarity defined by the first and second conductive plates 14 and 17. The securement plates 23 and 24 are in electrical association with the radar detector 22, wherein a first or negative wire 30 is in electrical communication between the first securement plate 23 and the radar detector 22, with a second or positive wire 31 in electrical communication between the radar detector 22 and the second securement plate 24. Clearly upon engagement of the respective securement plates 23 and 24 with their respective conduction plates 14 and 17, the radar detector is in immediate electrical communication with the electrical circuitry of an associated automobile when the detector 22 is secured to the support plate 11.

FIG. 6 illustrates a modified securement plate 23a to replace the securement plates 23 and 24 of the invention. The plate 23a is formed with a "U" shaped groove 42 to receive a "U" shaped conductive strip 27 formed about three sides and orthogonally mounted to a modified magnetic plate 17a to replace the magnetic plates 17 and 14 of the invention, as illustrated in FIG. 5 for example. The "U" shaped conductor strip 27 is formed with a lower knife edge 28 to enhance registry within the "U" shaped groove 42 to interlock the conductive strip 27 with the "U" shaped groove 42. The conductive plate 27 is further provided with magnetic properties from plate 17a to ensure securement between the modified securement plate 23a and the modified contact plate 17a. It is understood that the magnetic plate 17a may be utilized in lieu of the magnetic plates 17 and 14, and that the modified securement plate 23a may be utilized in lieu of the securement plates 23 and 24.

Reference to FIG. 7 illustrates a modified support plate 32 formed with a first and second flexible strap 33 and 34 that are in turn provided with a respective first and second hook and loop fastener patch 35 and 36 respectively formed to a free end surface of each of the straps 33 and 34. The hook and loop fastener patches 35 and 36 are in turn selectively engageable with a third and fourth hook and loop fastener patch 37 and 38 respectively formed to a forward edge of the modified support plate 32 to encompass and engage a visor "V".

FIG. 8 illustrates a further modified securement plate 11a formed with a modified "U" shaped flange 12 and the associated serrated confronting teeth 13a, wherein the modified support plate 11a includes a lateral strap 39 secured at one end to a lateral edge of the modified securement plate 11a, and is formed with a strap hook and loop patch 40 securable to a support plate patch 41 formed to an opposing side edge of the support plate 11a to ensure securement of an associated radar detector 22 that is secured between the strap 39 and the outer surface of the modified support plate 11a.

FIGS. 9-14 illustrate the use of an intermediate plate 50 utilized by the instant invention, wherein the intermediate plate includes the first and second securement plates 23 and 24 in electrical association with the respective negative and positive wires 30 and 31 and are electrically associated with an electrical connector plug 51. The intermediate plate is selectively securable to a top surface of the radar detector 22 by utilization of magnetic or adhesive strips 52, as illustrated in FIGS. 10 and 11 for example. Further, a plurality of spaced arcuate recesses 53 are positioned adjacent a forward edge of the intermediate plate 50. The arcuate recesses 53 are positioning recesses for receiving spaced semi-spherical projections 54 mounted upon a modified apparatus defining the support plate 11b. The support plate utilizes the first and second conductive plates 14 and 17 that are in turn electrically associated with a battery "B", wherein with reference to FIG. 12, the connector plug 51 is received within an appropriate socket within a rear of the radar detector 22 to provide electrical energy thereto, wherein the first and second electrical conductor plates 14 and 17 of the modified support plate 11 direct electrical current from the battery "B" to the first and second conductive plates within the intermediate plate. The modified support plate 11 includes a plurality of spaced lower "U" shaped flanges 55 receiving and locking the intermediate plate 11 at its rear end therewithin as the spaced projections 54 are received within the arcuate recesses 53, while the overlying "U" shaped flange 12 permits securement to a respective visor and the like as required.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A mounting apparatus for securement to an automotive visor of an automobile for securement of a radar detector thereon, the radar detector including a top surface for securement to the apparatus, and wherein the apparatus comprises, a planar support plate including a mounting means for mounting the support plate to the visor, the support plate further including a first and second conductive plate in electrical communication with the automobile, and the first and second conductive plates further including a respective first and second magnetic means for magnetic securement to the top surface of the radar detector, and a first and second securement plate fixedly mounted to the top surface of the radar detector for respective securement to the respective first and second magnetic means, and the first securement plate and the second securement plate in electrical communication with the radar detector, whereupon securement of the radar detector to the support plate provides electrical communication of the radar detector to the automobile.

2. An apparatus as set forth in claim 1 wherein first and second projections of dissimilar geometric configuration are mounted between the first and second securement plates on the top surface of the radar detector, and further including a first and second recess of dissimilar configuration formed between the first and second conductive plates, wherein the first and second recesses are of a complementary configuration to the second and first projection respectively to receive and properly align the radar detector and the first and second securement plate relative to the first and second magnetic means.

3. An apparatus as set forth in claim 2 wherein the first and second magnetic means each comprises respectively a first and second conductive strip mounted to opposed lateral edges of the first and second magnetic plate, and wherein the first and second conductive strips are each orthogonally aligned relative to the respective first and second magnetic plates, and the respective first and second conductive strips define a first and second pair of conductive strips respectively secured to the respective first and second magnetic plates, and wherein the respective first and second pairs of conductive strips associated with the respective first and second magnetic plates each define a predetermined spacing therebetween equal to a predetermined width defined by each of the respective securement plates, and wherein the securement plates define a predetermined length equal to or greater than a predetermined length defined by the first and second conductive strip pair.

4. An apparatus as set forth in claim 3 wherein the mounting means comprise a "U" shaped flange, the "U" shaped flange including a serrated surface in confronting relationship to a bottom surface of the support plate.

5. An apparatus as set forth in claim 4 wherein the mounting means further includes a lateral flexible strap mounted at one edge thereof to a first side of the support plate, and wherein the strap includes a free end, the free end further including a hook and loop fastener patch thereon securable to a hook and loop fastener portion formed on a second side of the support plate opposed from the first side, wherein the strap provides surrounding engagement with the radar detector.

6. An apparatus as set forth in claim 3 wherein the mounting means includes a first and second flexible strap, the first and second flexible strap secured at one end thereof to a rear edge of the support plate, and the first and second straps include a respective first and second hook and loop fastener patch to a forward end of the first and second flexible strap securable to a respective first and second hook and loop fastener portion mounted to a forward edge of the support plate to surroundingly engage the automotive visor between the first and second straps and the support plate.

7. An apparatus as set forth in claim 1 wherein the first and second magnetic means comprise a "U" shaped flange integrally and orthogonally mounted to a perimeter defined by the respective first and second conductive plate, and wherein the "U" shaped flange includes a lower knife edge, and each of the first and second securement plates include a "U" shaped recess positioned in alignment with the "U" shaped flange secured to the respective first and second conductive plate.

* * * * *